(12) United States Patent
Zhang

(10) Patent No.: US 7,358,957 B2
(45) Date of Patent: Apr. 15, 2008

(54) INPUT DEVICE WITH ADJUSTABLE CABLE ARRANGEMENT

(75) Inventor: Hui-Zhen Zhang, Taipei (TW)

(73) Assignee: Kye Systems Corporation, Taipei (TW)

( * ) Notice: Subject to any disclaimer, the term of this patent is extended or adjusted under 35 U.S.C. 154(b) by 552 days.

(21) Appl. No.: 10/974,793

(22) Filed: Oct. 28, 2004

(65) Prior Publication Data

US 2006/0114226 A1    Jun. 1, 2006

(51) Int. Cl.
*G09G 5/08* (2006.01)
(52) U.S. Cl. .................. 345/163; 345/156; 345/157
(58) Field of Classification Search ........ 345/156–184, 345/214, 8, 31, 110, 650, 661, 676; 361/686, 361/683; 463/37–39
See application file for complete search history.

(56) References Cited

U.S. PATENT DOCUMENTS

| 5,997,339 | A  | * | 12/1999 | Fuji et al. ................. 439/446 |
| 6,220,889 | B1 | * | 4/2001  | Ely et al. .................. 439/446 |
| 6,747,634 | B1 | * | 6/2004  | Yang ......................... 345/168 |

* cited by examiner

*Primary Examiner*—Alexander Eisen
*Assistant Examiner*—Christopher E Leiby
(74) *Attorney, Agent, or Firm*—Bacon & Thomas, PLLC

(57) ABSTRACT

The present invention relates to a wired input device with an adjustable cable arrangement. The wired input device may include, but is not limited to, a computer mouse, track ball, or game controller. To enable adjustment of cable position, the wired input device includes an adjustment mechanism that permits the position and direction at which the cable exits the device to be changed.

4 Claims, 9 Drawing Sheets

INPUT DEVICE WITH ADJUSTABLE CABLE ARRANGEMENT

BACKGROUND OF THE INVENTION

1. Field of the Invention

The present invention relates to an input device, and in particular, to a wired input device with an adjustable cable arrangement. The wired input device may be, but is not limited to, a computer mouse, track ball, or game controller, and includes a cable position adjustment mechanism located within the input device for adjusting a position of the cable to prevent the cable from interfering with operation of the input device itself, or with operation of another adjacent input device.

2. Description of the Prior Art

Even though wireless input devices have been available for a long period of time and are well-established, wired input devices still cannot be replaced entirely. The reason is that wired input devices are lower in cost, and have the advantage that the user does not have to worry about a shortage of power supplied by batteries in the input devices.

Referring to FIGS. 9-10, a wired mouse 70 is connected to a laptop computer 80. The laptop computer 80 is often carried and placed on a non-desk working surface. Therefore, during operation, the mouse 70 has to be moved in a relatively narrow space between a keyboard and a touch pad of the laptop computer 80. In that case, once the user moves the mouse 70, the cable 71 must either be moved accordingly, or the cable 71 will hamper typing by the user. While most users place their mouses on a desk with large space, and therefore do not notice the interference by the cable, such interference is nevertheless a significant problem for those users who must use their laptop in the field, on non-desk working surfaces.

In addition, the problem arises that while most users hold their mice with their right hand, a left-handed user who wishes to operate a laptop computer with his or her left hand will cause the cable 71 to traverse the keyboard, and must move the cable out of the way every time typing is required. This extremely inconvenient defect has existed for a long time and yet has been ignored by peripheral makers.

SUMMARY OF THE INVENTION

It is therefore an objective of the present invention to provide a wired input device with a cable position adjustment mechanism for adjusting a position of the cable so that it exits the input device at a position, and in a direction, that is most convenient for the user, and that is least likely to cause interference with operation of the input device, the computer to which the cable is connected, or another input device such as a keyboard.

To accomplish the advantage mentioned above, the wired input device has a body, a printed circuit board (PCB), a cable and a position adjustment mechanism located within the body.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. Thus, although the wired input device of the invention is illustrated in FIGS. 1 and 2 as a computer mouse, the present invention is not limited to such a computer mouse, but rather may take the form of a track ball, keyboard, card reader, hub, game pad, or any other wired input device.

Figure 1:
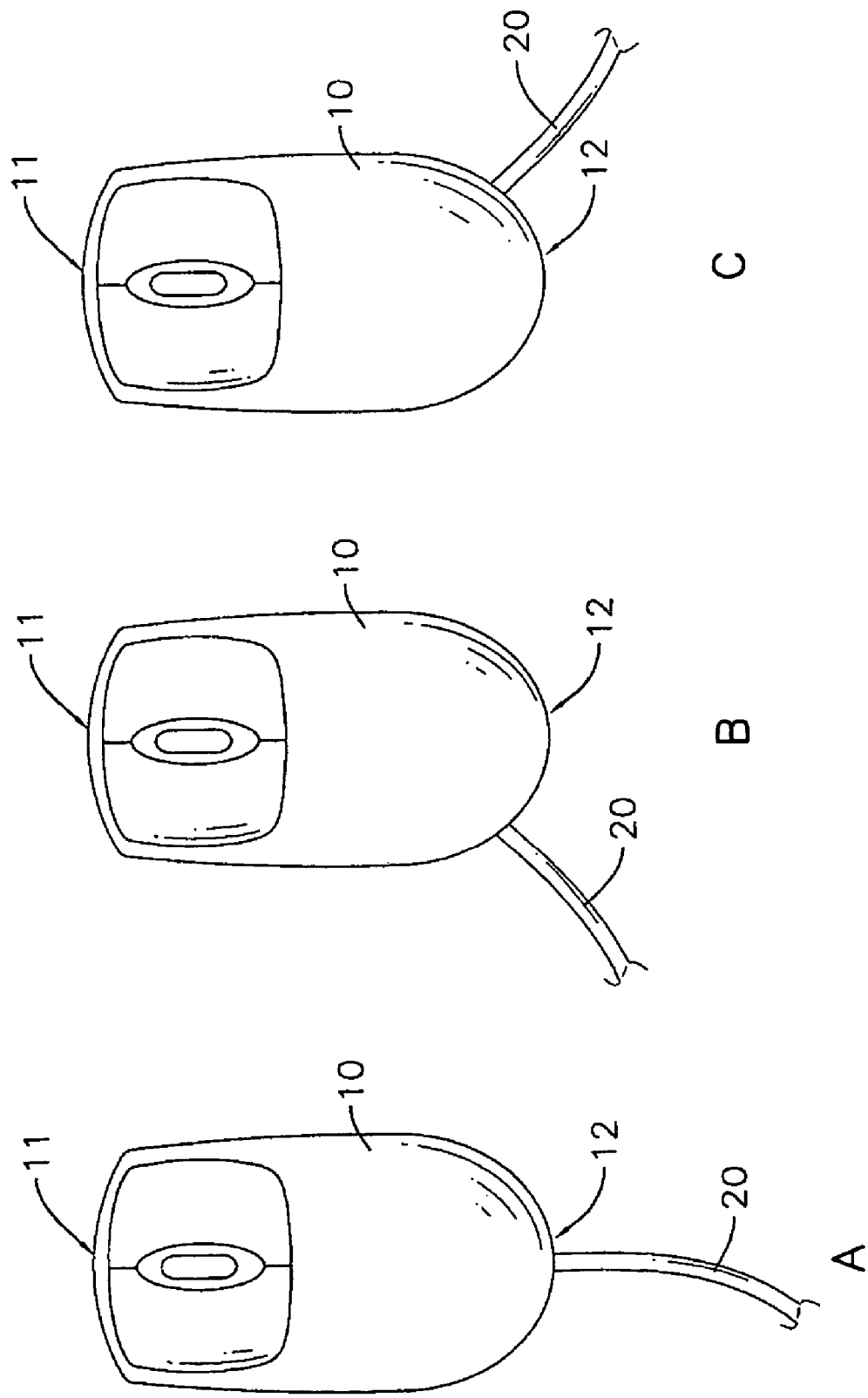
FIGS. 1A~1C is a top view of a preferred embodiment of the present invention, in which the cable may be adjusted or moved to three different positions.
Figure 2:
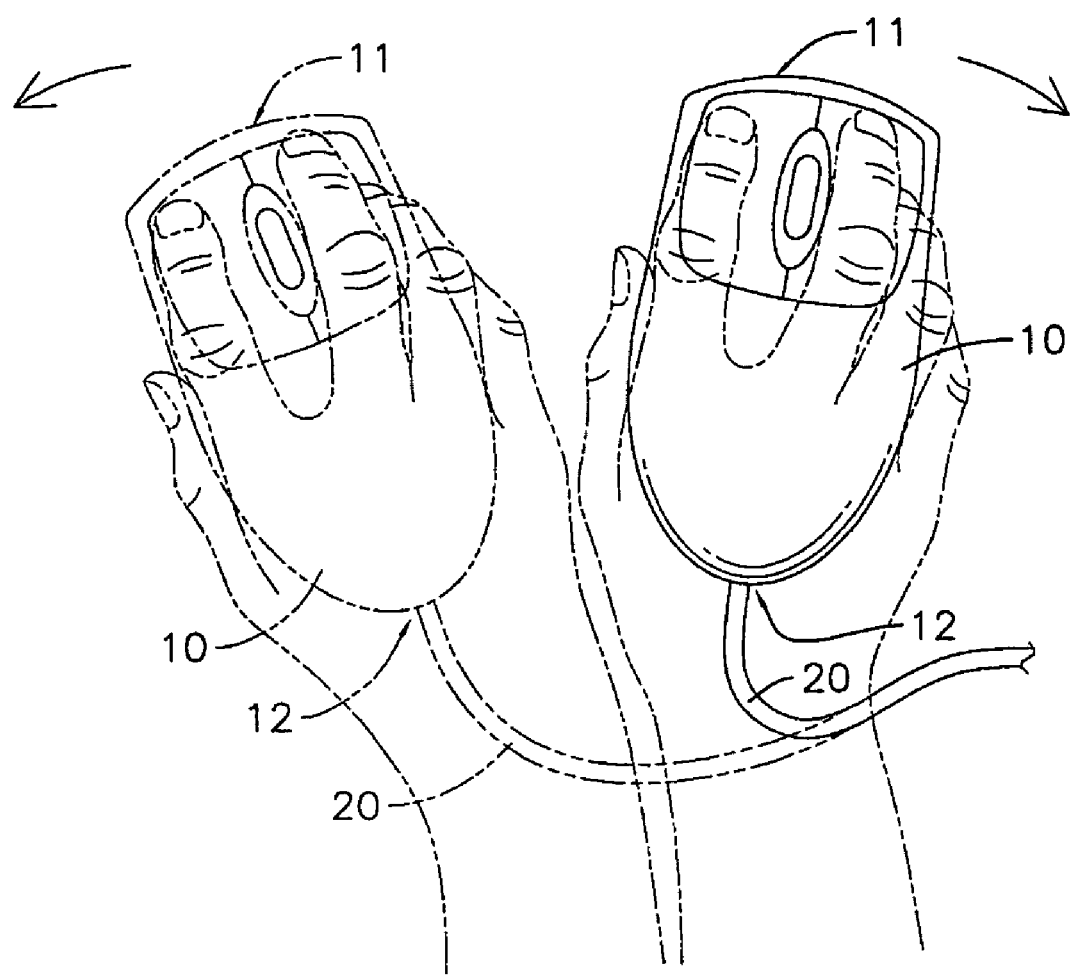
FIG. 2 is a top view of the preferred embodiment in operation by a user's hand.
Figure 10:
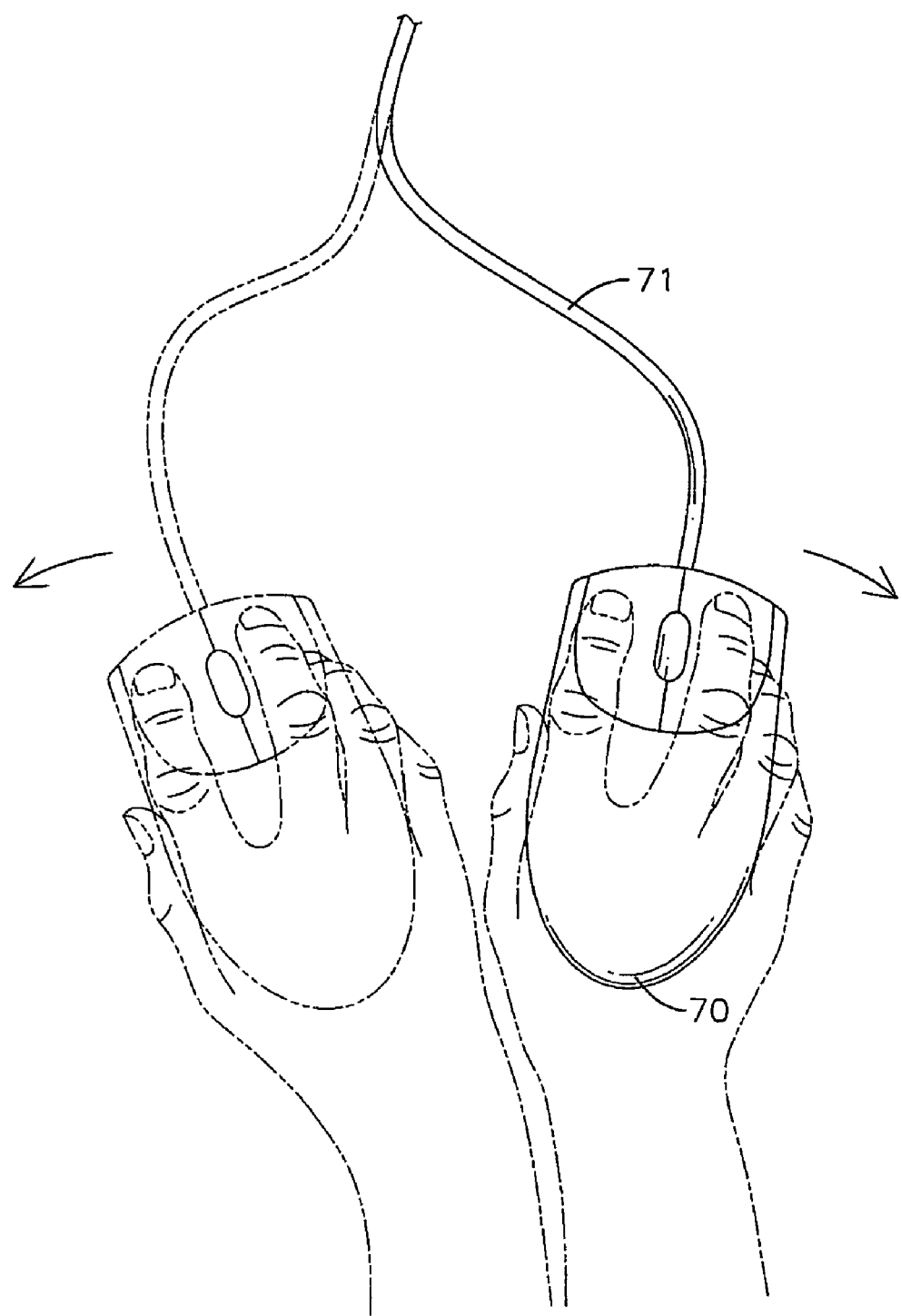
FIG. 10 is a top view of the prior art input device in operation by a user's hand.

Referring to FIGS. 1~2, the mouse 10 has a remote end 11 and a near end 12. The outlet of the cable 20 can be implemented in various directions. When a user holds the mouse 10 as illustrated in FIG. 2, the outlet of cable 20 is close to the near end 12, passing beneath the user's wrist as a fulcrum. However, the moving of the mouse has less momentum than the prior art illustrated in FIG. 10 because the cable 20 is located around the fulcrum of the wrist or the near end 12 of the mouse 10. Therefore the cable 20 won't drag the mouse while the user is swinging the mouse left and right.

Figure 3:
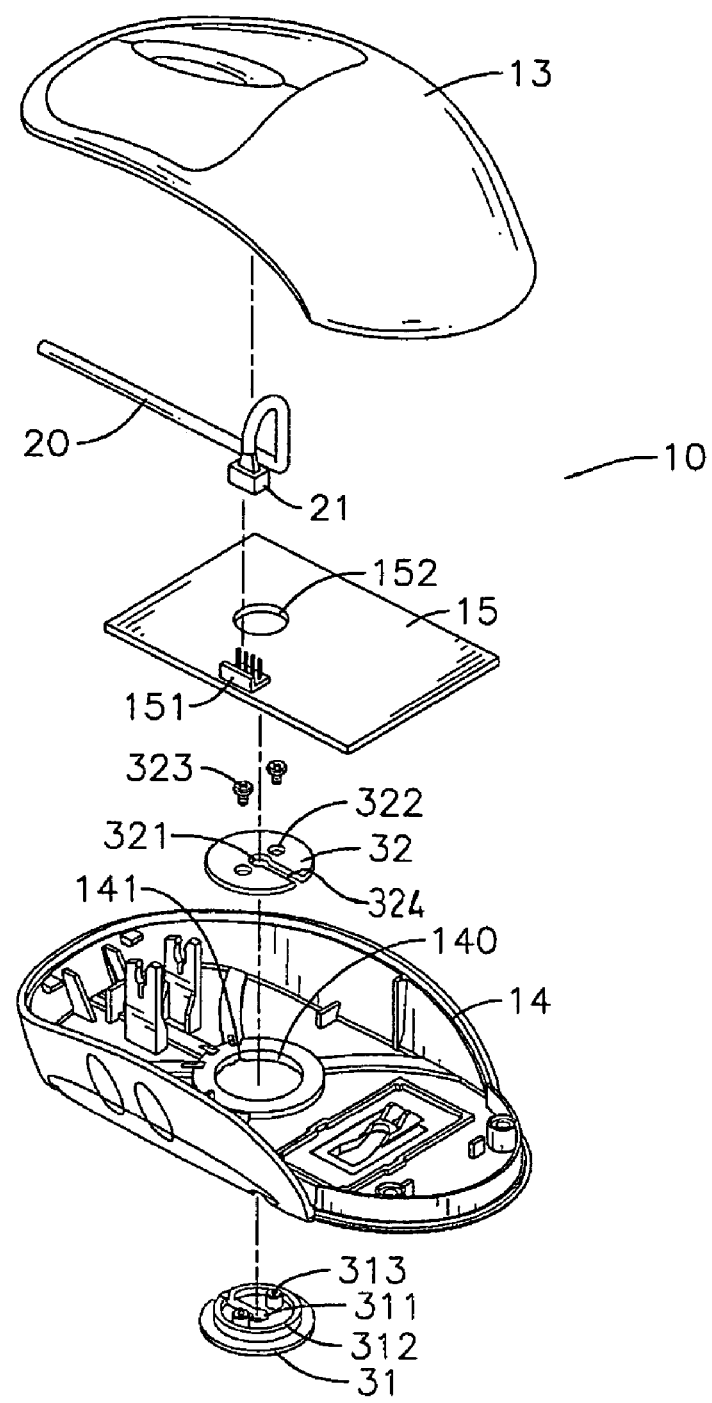
FIG. 3 is an exploded perspective view of an implementation of the preferred embodiment.

Referring to FIG. 3, the mouse 10 has a body made up of an upper housing 13 and a lower housing 14. The printed circuit board (PCB) 15 is positioned on the lower housing 14, which has a socket 151 for connecting to a plug 21 of a cable 20. The cable 20 penetrates the opening 152 and couples to an adjustable mechanism within the hole 140. A plurality of grooves 141 are located under the lower housing 14 in various directions.

The adjustment mechanism has a base 31 and a fixing plate 32. The base 31 has a slot 311 extending from the center of the base 31 to the edge of the base 31. The base 31 further has a protruding ring 312 having a thickness for fitting within the hole 140, and a pair of posts 313 thereon.

Figure 5:
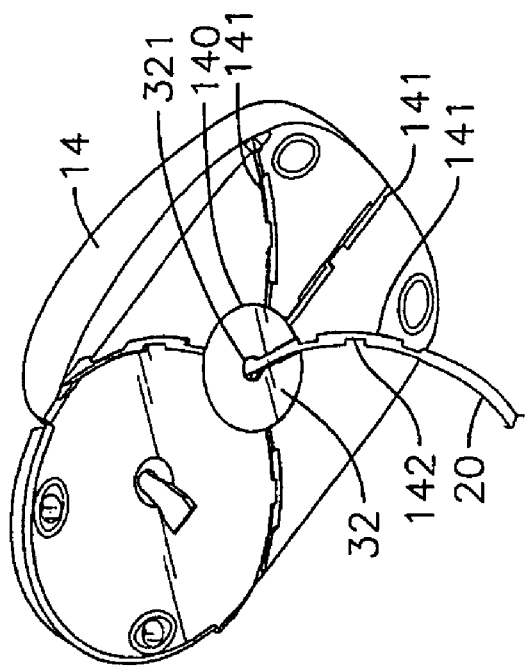
FIG. 5 is another bottom view of the preferred embodiment with the cable in a second position.
Figure 4:
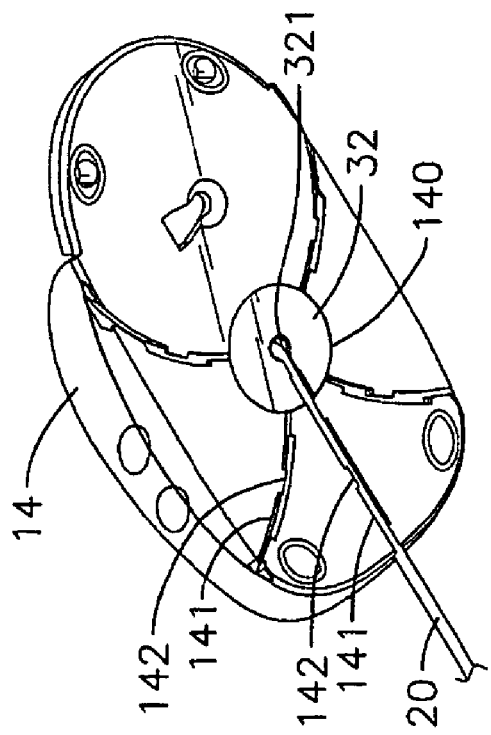
FIG. 4 is a bottom view of the preferred embodiment with the cable in a first position.
Figure 6:
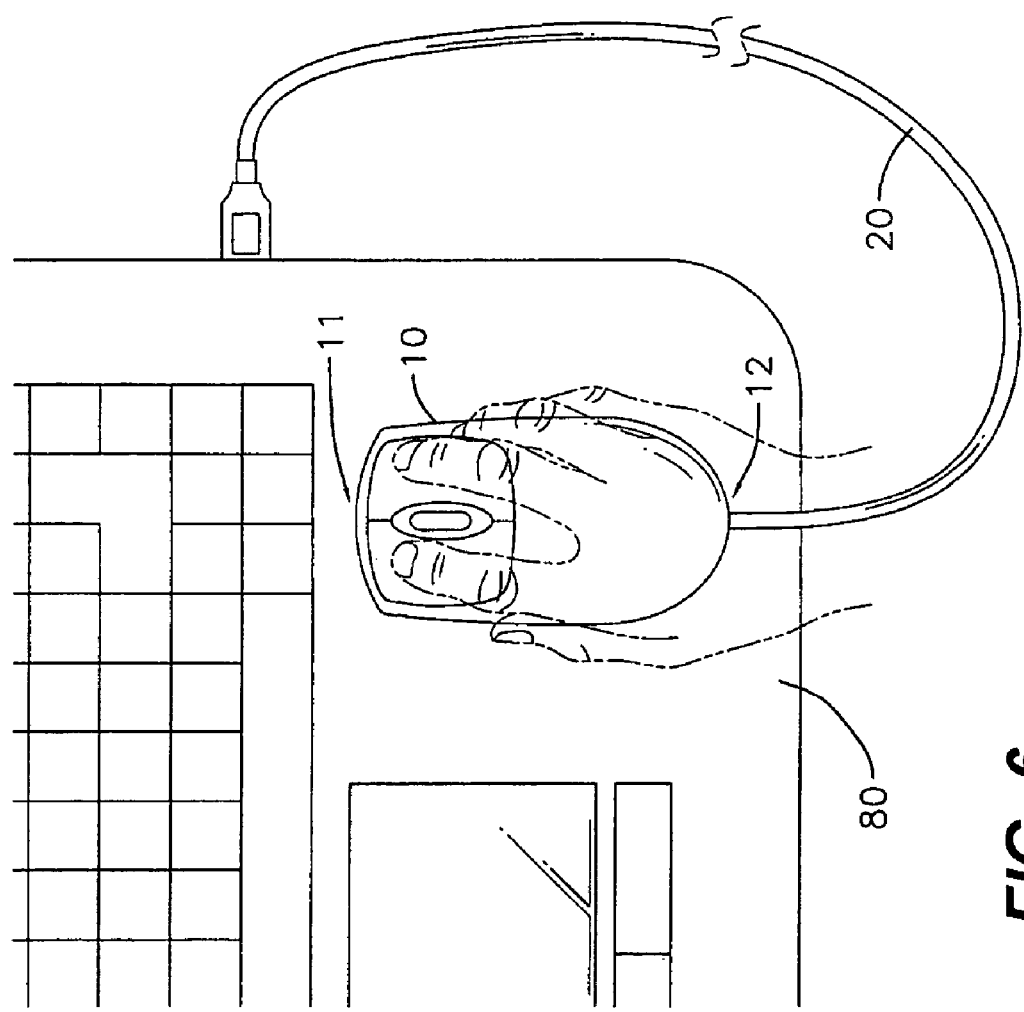
FIGS. 6~8 show operation of the present invention on a laptop computer.
Figure 7:
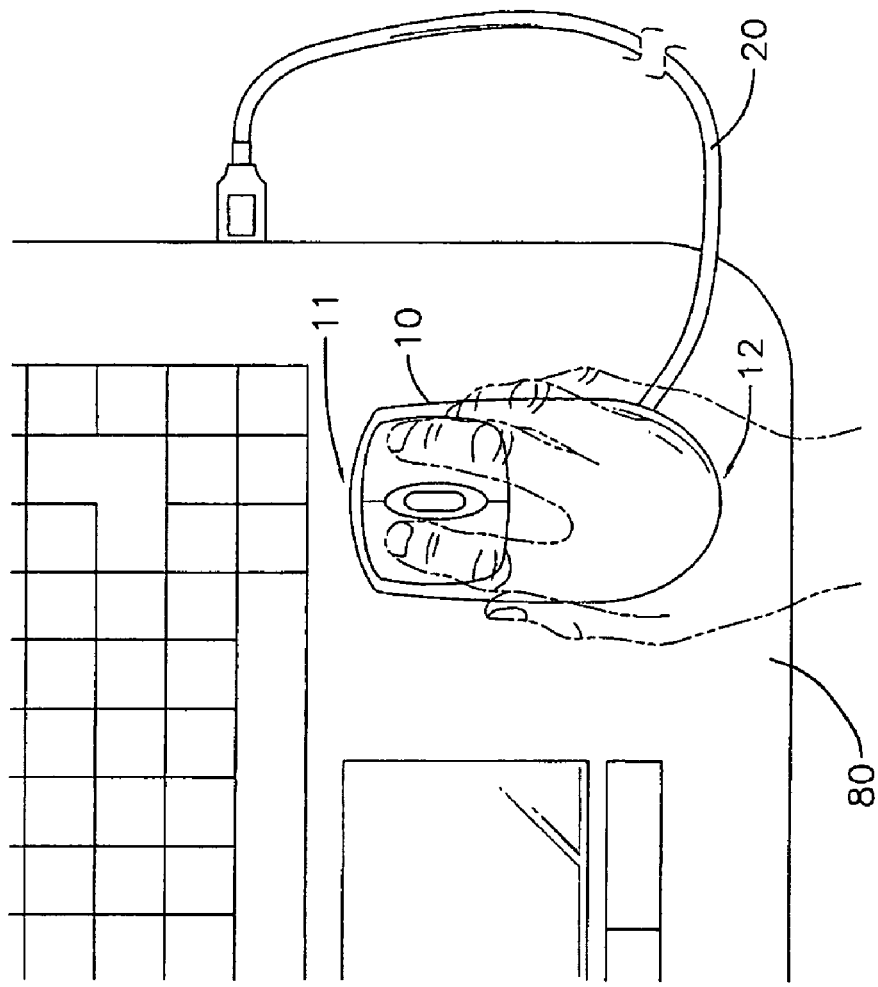
Figure 8:
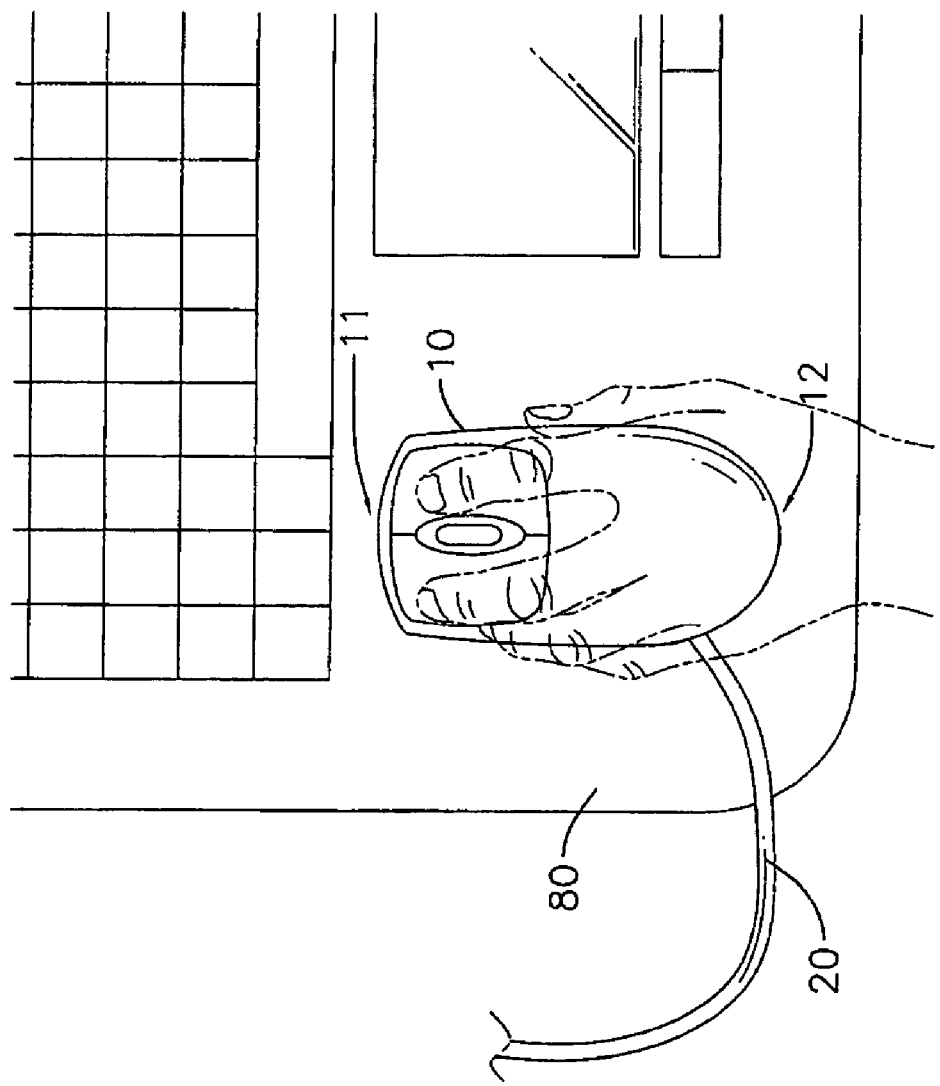
Figure 9:
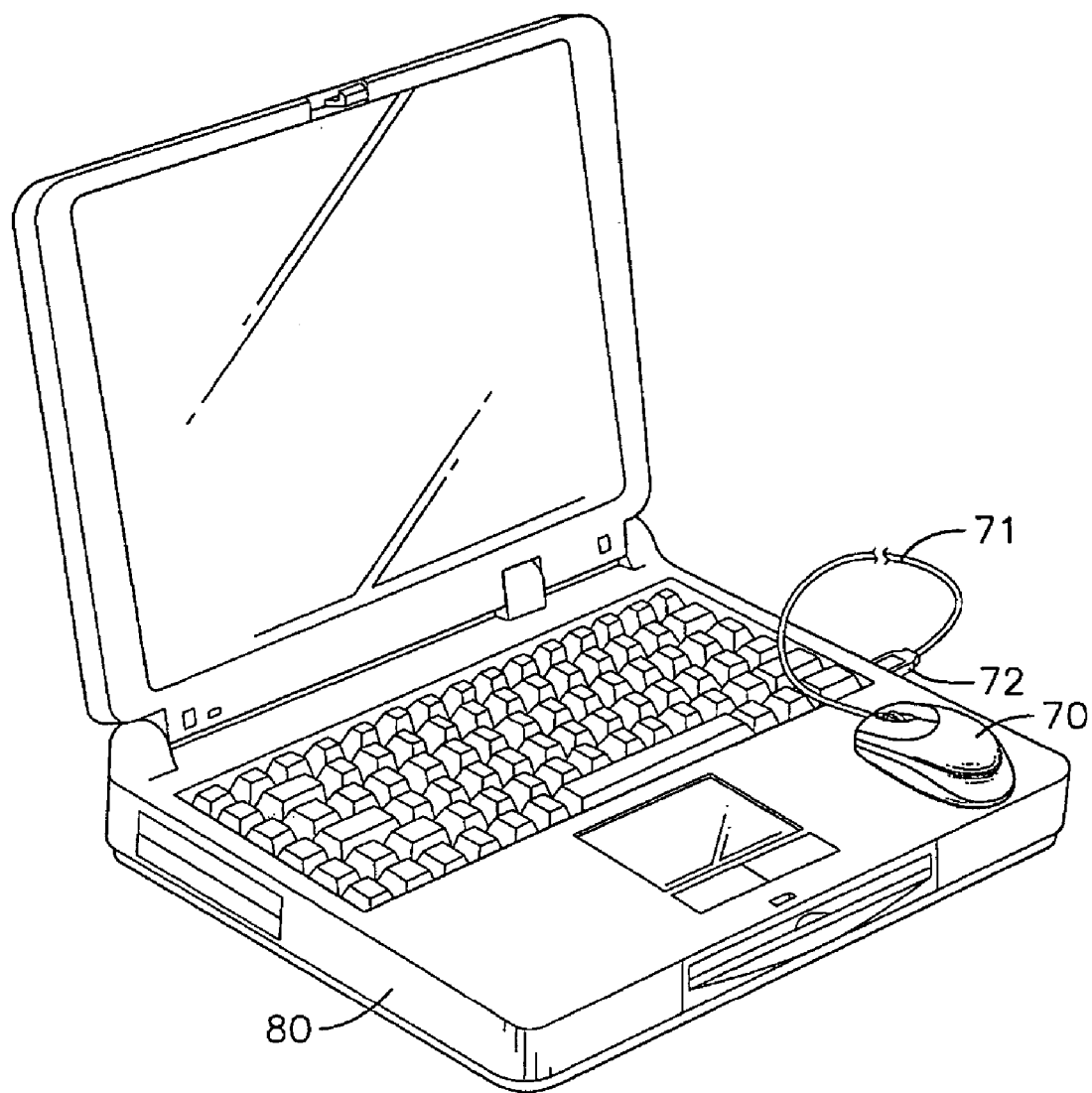
FIG. 9 illustrates operation of a prior art input device on a lap top computer.

The fixing plate 32 has a center hole 321, and two fixing holes 322 each corresponding to the post 313. Each of the screws 323 can penetrate the fixing hole 322 as to be screwed to the corresponding post 313. As shown in FIGS. 4 and 5, one end of the cable 20 is connected to the socket 151, and the other end penetrates the fixing plate 32 and the base 31. Then, the cable 20 is secured into a desired groove 141 by several extensions 142 on the groove 141 for further connection to a computer 80 as shown in FIGS. 6-8. The cable can be secured in any of the grooves shown in FIGS. 4 and 5 so as to extend from either side of the mouse, and in either a forward or a rearward direction.

Referring to FIG. 6, if a right-handed user wishes to operate the mouse 10 with less interference, the user may dispose the outlet of the cable 20 at the near end 11, secured in a rear side groove 141. Thus, the layout of the cable 20 is well arranged in a neat manner. Referring to FIG. 7, if the right-hand user doesn't like his wrist being contacted with cable 20, he may secure the cable 20 in another groove 141 so as to displace the outlet of the cable 20 toward a lateral side of the mouse 12. Referring to FIG. 8, if a left-hand user wishes to operate the mouse 12 less interference, the user may dispose the outlet of the cable 20 at another lateral side, secured in another lateral side groove 141.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A wired input device, comprising:
   a body having an upper housing and a lower housing;
   a printed circuit board located within the body;
   a cable; and
      a cable position adjustment means coupled to a hole of the lower housing for selectively positioning the cable to exit the body from different selected sides and in various selectable directions to minimize interference of the cable with operation of the wired input device, the computer to which the cable is connected, or another input device,
   wherein the cable position adjustment means includes at least three grooves extending from the hole at different angles, the cable being selectively secured in one of the grooves to determine the position and direction from which the cable exits the input device.

2. The wired input device as in claim 1,
   wherein the grooves include respective extensions for securing the cable within the grooves.

3. The wired input device as in claim 1,
   wherein the adjustment means has a base coupled to a fixing plate.

4. The wired input device as claim 3, wherein the base has a protruding ring having a thickness for fitting within the hole of the lower housing.

* * * * *